(12) United States Patent
Takashina et al.

(10) Patent No.: US 6,461,165 B1
(45) Date of Patent: Oct. 8, 2002

(54) CARDIOLOGY PATIENT SIMULATOR

(75) Inventors: Tsunekazu Takashina, Hyogo; Tamotsu Katayama, Kyoto, both of (JP)

(73) Assignee: Kyoto Kagaku Company Ltd., Kyoto (JP)

(*) Notice: Subject to any disclaimer, the term of this patent is extended or adjusted under 35 U.S.C. 154(b) by 0 days.

(21) Appl. No.: 09/347,420

(22) Filed: Jul. 6, 1999

(30) Foreign Application Priority Data

Jul. 3, 1998 (JP) .................................. 10-225154

(51) Int. Cl.⁷ .............................................. G09B 23/28
(52) U.S. Cl. ....................................... 434/265; 434/262
(58) Field of Search ................................. 434/262, 265, 434/267; 446/268, 296, 297, 373

(56) References Cited

U.S. PATENT DOCUMENTS

| | | | |
|---|---|---|---|
| 5,073,140 A | * 12/1991 | Lebensfeld et al. | 446/268 |
| 5,733,131 A | * 3/1998 | Park | 446/268 |
| 5,823,787 A | * 10/1998 | Gonzalez et al. | 434/265 |
| 5,941,710 A | * 8/1999 | Lampotang et al. | 434/272 |
| 6,215,057 B1 | * 4/2001 | Oren-Chazon | 446/268 |

FOREIGN PATENT DOCUMENTS

| | | |
|---|---|---|
| JP | 60-171430 | 9/1985 |
| JP | 62-109504 | 5/1987 |
| JP | 63-38978 | 2/1988 |

OTHER PUBLICATIONS

Takashina et al., "A New Cardiology Patient Simulator", *Cardiology*, 1997.
Takashina et al., "M64 New Cardiology Patient Simulator A.V.P. Training Simulator 'K'" System, issued by Kyoto Kagaku Co., Apr. 1998.
Takashina et al., "M64 New Cardiology Patient Simulator A.V.P. Training Simulator 'K'" System, issued by Kyoto Kagaku Co., Ltd., Mar. 1997.
Leaflet issued by Kyoto Kagaku Co., Ltd., Sep. 1997, Japan.

* cited by examiner

*Primary Examiner*—Sam Rimell
(74) *Attorney, Agent, or Firm*—Arent Fox Kintner Plotkin and Kahn PLLC

(57) ABSTRACT

A tube deformed by supply air is placed in a pulsation position of a mannequin. An air pump expanding and contracting by supply air is placed in a cardiac impulse position of the mannequin. An air bag is placed inside an abdomen or a chest of the mannequin. An air supplier is controlled by a computer.

1 Claim, 4 Drawing Sheets

FIG.1(a)　　　FIG.1(b)　　　FIG.1(c)
(ECG)  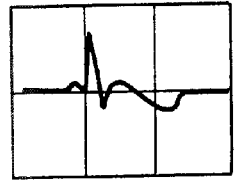 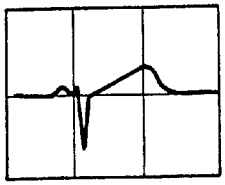
(CAP) 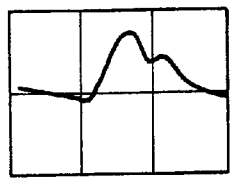 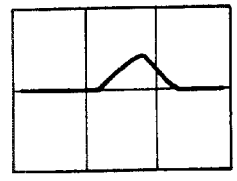 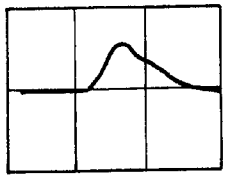
(JVP) 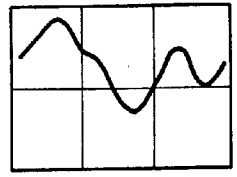  
(ACG) 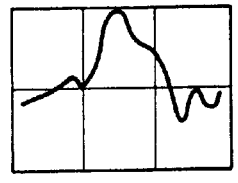 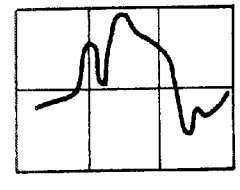 
(A) 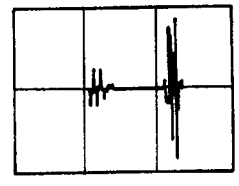 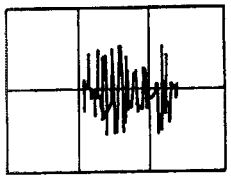 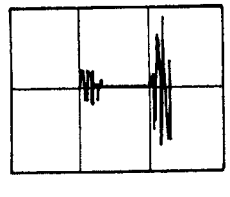
(P) 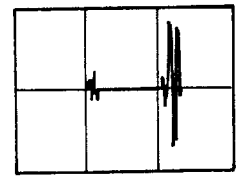 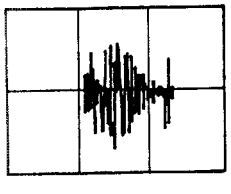 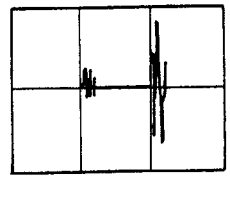
(T) 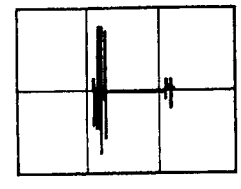 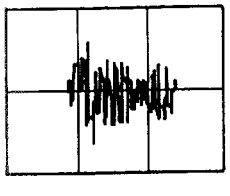 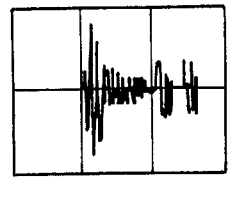
(M) 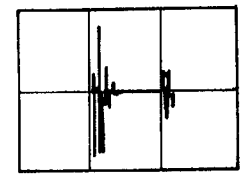 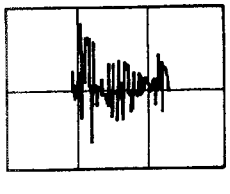 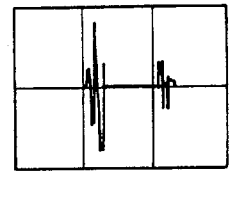

CARDIOLOGY PATIENT SIMULATOR

BACKGROUND OF THE INVENTION

1. Field of the Invention

The present invention relates to a cardiology patient simulator for medical training, which comprises mannequin made of foam material that has a skin layer on its surface. This simulator is utilized for training of diagnosis, for example, auscultation, palpation, inspection, etc..

2. Description of Related Art

This kind of simulator was disclosed in Japanese Non-examined Patent Publication No. 63-38978.

As shown in FIG. 1, electrocardiogram(ECG), carotid-arterial pulse(CAP), or apex cardiogram(ACG) has subtle waveform although they are a normal wave. Further, heartbeat has different waveform depending on each place (aortic, pulmonic, tricuspid, and mitral), and each of them has also subtle waveform.

Said simulator uses a mechanical system, which has a plunger wherein a solenoid is moved by electric signal wave, to generate arterial pulse, venous pulse, or cardiac impulse. However, it was impossible for said simulator to reproduce subtle waveform because the solenoid can move the plunger only between two positions.

FIGS. 1(b)(c) show examples of each waveform when having a disease. Because both waveforms in contracting (b)aortic stenosis and (c)tricuspid regurgitation are extremely subtle, it is impossible to reproduce those waveforms precisely by using the mechanical system. Thus, medical training, which is carried out by comparing disease waveform with normal waveform, did not meet actual condition.

When operating the solenoid or the plunger mechanically, it gives rise to some noise without exception. Aortic sound (A), pulmonic sounds), tricuspid sound(T) and mitral soundM) are similar to each other as shown in FIG. 1, or they can be similar to each other by overlapping with such noise. Therefore, there is high possibility of misdiagnosis when said system generates arterial pulse, venous pulse, or cardiac impulse mechanically in the simulator, and hence the simulator can not achieve its purpose.

Further, a simulator for auscultation training of heart sound is disclosed in Japanese Examined Patent Publication No. 5-27113. This simulator has speakers which reproduce recorded normal and diseased heart sound for training of heart auscultation. However, as shown in FIG. 1, since cardiac disease changes arterial pulse, venous pulse, cardiac impulse and respiration as well as heart sound, it is necessary to diagnose heart sound and all of these pulses totally. Therefore, a simulator for medical training which can generate heart sound and these pulses is expected.

SUMMARY OF THE INVENTION

1. Objects of the Invention

An object of the present invention is to provide an improved simulator for medical training which generates arterial pulse, venous pulse, cardiac impulse, respiration, etc. precisely without any vibration sound or noise.

2. Technical Means

The technical means for attaining the above object is to generate physiological phenomenon, for example, pulsation, heartbeat, respiration, etc. in diagnosis positions by utilizing a change of air pressure and to change air pressure by an air supplier controlled by an electric signal supplier.

Generating pulsation, heartbeat, respiration, etc. by utilizing the change of air pressure, it gives rise to no mechanical vibration sound reaching diagnosis positions through air. Therefore, there is no possibility of giving rise to any noise when diagnosing. Further, since air pressure is changed by the air supplier controlled by the electric signal supplier, it is possible to generate normal wave and disease wave precisely by adjusting air pressure subtly.

Air pressure is changed, for example, by the air supplier with an electric-air proportional control valves controlled by the electric signal supplier.

Therefore, the simulator of the present invention enables to reproduce pulsation, heartbeat, respiration, etc. precisely in diagnosis positions without generating any mechanical vibration.

Incidentally, it is preferable to adopt a foam material, which forms the mannequin, whose elasticity is similar to that of human body and whose conductivity of sound is small. For example, a urethane foam or vinyl chloride foam is suitable therefor. Also soft vinyl chlorides or silicone resins are suitable for the skin layer.

In detail, the technical means for diagnosing pulsation is to place a tube, which changes its thickness by inside air pressure, along the back side of the skin layer in a pulsation position, to support the tube from the back side of the mannequin by a supporter made from soft material, and to generate pulsation by supplying said tube with air.

Since the present invention generates pulsation by changing air pressure inside the tube, it enables to reproduce the expansion and contraction of vessel without mechanical vibration. And since the tube is placed along the back side of the skin layer being supported by the supporter, it is possible to exactly diagnose the expansion and contraction of the tube as pulsation of vessel.

Further, since the supporter is made of soft material such as soft rubbers or soft synthetic resins, it is possible to reproduce feeling in a finger that is similar to the human body diagnosis, and to prevent the tube from damage.

It is preferable to use soft rubbers or synthetic resins for the tube, so that the tube could be flexible and strong as the substitution of vessel. For example, a thin silicone rubber tube, which is 4 to 6.5 mm in a diameter and is 0.2 to 0.6 mm in thickness, is suitable therefor. However, it is preferable to choose the material for said tube taking into consideration thickness and hardness of the skin layer, thickness of vessel, strength and weakness of pulsation, etc.

The technical means for diagnosing cardiac impulses is, in detail, to place an air pump expanding and contracting by supplied air, to transmit expansion and contracting of the air pump to the skin layer in a cardiac impulses position by a transmitter, which includes plural transmitting members having different natural frequency from each other.

Since cardiac impulses are generated by changing air pressure supplied to the air pump, it is possible to reproduce cardiac impulses without any mechanical vibration. Since the expansion and contraction of the air pump is transmitted to the skin layer by the transmitter, it is possible to diagnose exactly as cardiac impulses the movement of the transmitter. Since the transmitter includes plural transmitting members having different natural frequency from each other and the expansion and contraction of the air pump is transmitted through said members, it is able to prevent the transmitter resonating. When the transmitter comprises a touching member which touches the skin layer, a stand which is equipped the air pump, and an arm which connects the touching member with the stand, it is preferable that all the stand, the touching member and the arm have different natural frequency from each other in order to prevent resonating almost perfectly.

And an arm, which constitutes said transmitter, connects with the air pump in the direction crossing the expansion and contraction direction of the air pump. Even if the air pump generates any sound, such sound propagates in the expansion and contraction direction of the air pump. Therefore, it is possible to suppress propagation of such sound through the arm.

The technical means for diagnosing respiration is, in detail, to place an air bag, wherein an air permeable and sound insulating sheet is confined, inside of the abdomen or chest of the mannequin, and to generate respiration by supplying air into the air bag.

Since respiration generates by supplying air to the air bag placed inside the abdomen or chest of the mannequin, it is possible to reproduce the expansion or contraction of the abdomen or chest. Further, since the air permeable and sound insulating sheet is confined in the air bag, it is possible to diagnose respiration exactly without any noise when the air bag expands and contracts by the supply of air.

It is preferable to form the air bag by using the air permeable materials such as synthetic resins or rubbers. Sponges, aerated rubbers, synthetic resin foams, non-woven fabrics, etc. are suitable for the air permeable and sound insulating sheet. Although it is preferable to use the materials whose specific gravity is high as such materials can insulate sound well, it is also desirable to consider if such materials are easy to process or to treat. Glass fiber non-woven fabrics are suitable for the sound insulating materials of the present invention as the same can insulate sound well and are easy to process.

Another technical means for examining heart disease, in detail, to place a speaker, connected with a cardiac sound reproducer, behind the chest of the mannequin, to control the cardiac sound reproducer and the air supplier which operates corresponding to arterial pulse, venous pulse, cardiac impulse or respiration by the electric signal supplier, and to synchronize variation of air pressure with sound reproduction.

Since the speaker connected with the recorded cardiac sound reproducer is installed behind the chest of the mannequin, it is possible to listen to cardiac sound only by putting a stethoscope to the chest of the mannequin. And since pulsation, cardiac impulse, or respiration are generated by changing air pressure supplied to the air pump, it is possible to reproduce them without any mechanical vibration. Since variation of air pressure, which generates pulsation, cardiac impulse, or respiration, is synchronized with sound reproduction, it is possible to coincide cardiac sound required for cardiac diagnosis with physiological phenomenon. Thus, the present invention enables more precise training of cardiac diagnosis.

Further, there is another technical means in connection with the air supplier, in detail, to insert an air inhalant pipe into a sealed cylinder from its one side and an air exhaust pipe from another side of the sealed cylinder, and to intervene an air permeable and sound insulating material between the air flow way of both pipes.

Since the air inhalant pipe is inserted from one side of the sealed cylinder and the air exhaust pipe is inserted from another side of said cylinder, the supplied air never flows from the air inhalant pipe to the air exhaust pipe directly without being exhausted once into said cylinder. And since the air permeable and sound insulating material is intervened between the flow ways of both pipes, the air flowing from the air inhalant pipe to the air exhaust pipe passes through said material and hence mixed noises are almost eliminated.

The way to make air pass through the air permeable and sound insulating material is to cover the end of said pipes with caps made from sound insulating material or to form a partition made from sound insulating material inside of said cylinder. Another way is to form the total of the portions, which exist inside of said cylinder, of the air inhalant pipe and the air exhaust pipe, longer than said cylinder and to intervene an air permeable and sound insulating partition between both pipes.

Therefore, the present invention enables more precise diagnosis as air is supplied to the tube, the pipes and the air bag which reproduce arterial pulse, venous pulse, cardiac impulse and respiration without any noise.

Still another technical means is, in connection with an adjusting device, in detail, to equip the mid portion of the air supply pipe with a diverging coupler, and connect a branch pipe to the diverging coupler, and to equip the top end of the branch pipe with an air pressure control valve.

Since the ratio of time of inspiration to expiration is 3 to 2 regarding respiration as physiological phenomenon, it is impossible to maintain said ratio only by adjusting air pressure.

Since the diverging coupler is equipped the mid portion of the air supply pipe to the air bag and the branch pipe is connected with the diverging coupler, it is possible to adjust volume of supply air and volume of exhaust air from the air bag by utilizing the diverging coupler and the branch pipe.

Since the air pressure control valve is equipped the top end of the branch pipe, it is possible to reproduce respiration as physiological phenomenon, as the ratio of period of inspiration to expiration can be 3:2 by adjusting the air pressure control valve and the diverging coupler. Although air friction sound is given rise to when exhaust air is passing through the air pressure control valve, it is possible to auscultate natural respiration since said air friction sound reproduces expiration sound just as it is.

BRIEF DESCRIPTION OF THE DRAWINGS

FIG. 1 is a graphical representation showing waveforms of cardiac signals.

DESCRIPTION OF THE PREFERRED EMBODIMENTS

The present invention will be described hereinafter in accordance with the embodiments.

Figure 2:
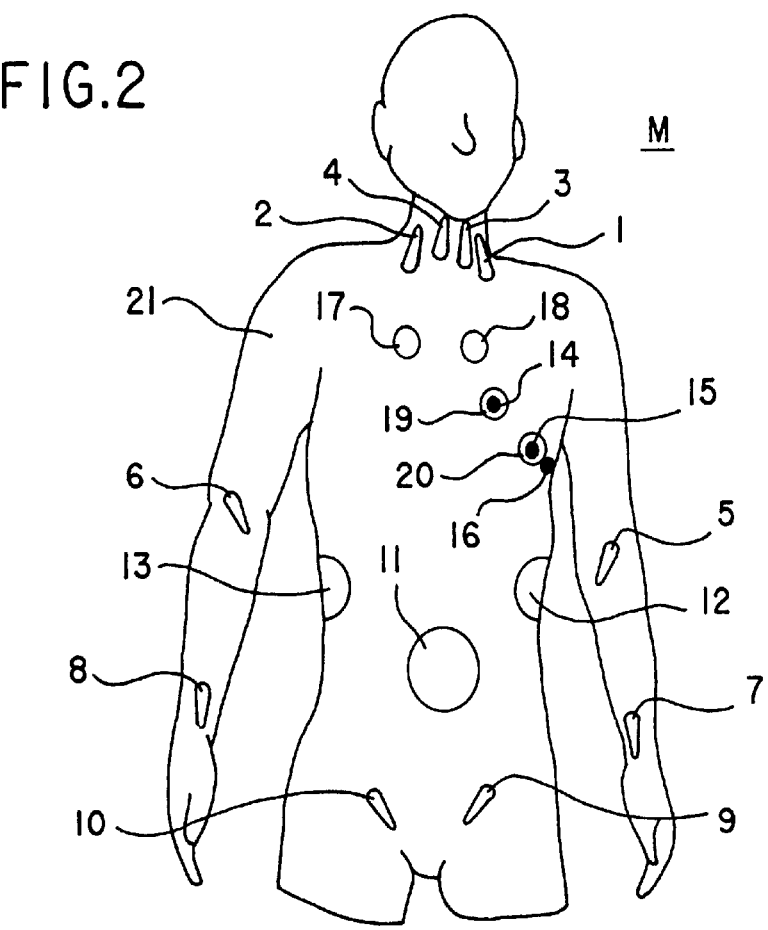
FIG. 2 is a front view showing the mannequin.
Figure 3:
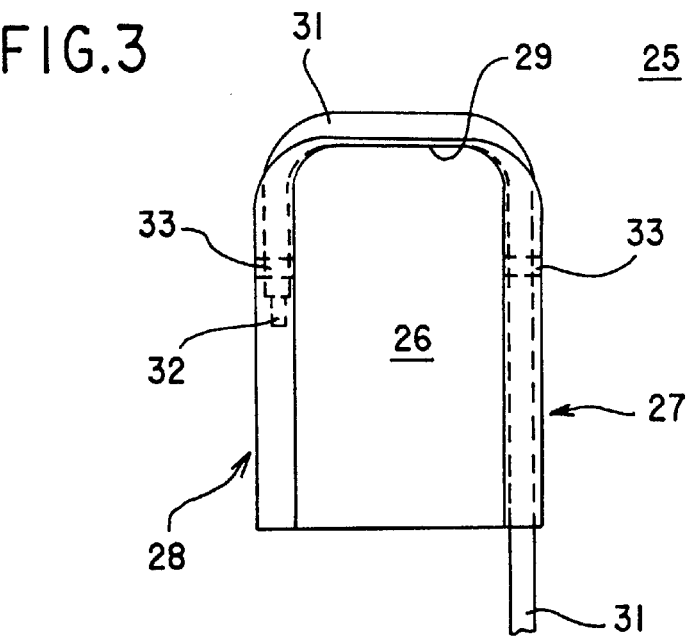
FIG. 3 is a plan view showing the pulsation generator.

FIG. 2 is a plan view of a mannequin M which shows an upper half of human body from an upper part of thigh. The mannequin M comprises a urethane foam body 22, and this urethane foam body 22 has a skin layer 21 which is made of soft vinyl chloride resins.

The mannequin M has pulsation diagnosis positions, which is related to vinous pulse, in jugular positions 1,2, and has diagnosis positions, which is related to arterial pulse, in carotid positions 3,4, brachial artery positions 5,6, radial artery positions 7,8, and thigh artery positions 9,10.

The mannequin M breathes from an abdomen 11. And related to breath wave, the mannequin M has auscultation positions at walls of the chest 12, 13 on both side of the abdomen 11.

The mannequin M has palpation positions, which is related to cardiac impulse, in a right ventricle position 14, a left ventricle part 15, and a dilated left ventricle position 16.

The mannequin M has speakers in a aortic position 17, a pulmonic position 18, a tricuspid position 19 and a mitral position 20 in order to enable to auscultate cardiac sound.

In the aforesaid position 1–10, halls 23, which reach skin layer 21, are made in the foam body 22 from the back of the mannequin M. A pulsation generator 25 is installed in the halls 23 and is supported by the foam body 22 utilizing its elasticity.

This pulsation generator 25 comprises a plank 26 and a tube 31. The plank 26 is made from soft synthetic resins, and has grooves 27, 28 on its both side walls. The top end of the tube 31 is sealed, and the tube 31 is installed along the groove 27, 28 passing through a top portion 29 of the plank 26. The tube 31 is supported by the supporting pieces 33 so that the tube 31 may not come off the plank 26. The tube 31 is made of silicon tube with 5.6 mm outside diameter and 0.4 mm thickness. A little of baby powder is introduced into the inside of the tube 31 for preventing the adhesion of the inner wall of the tube 31.

Figure 4:
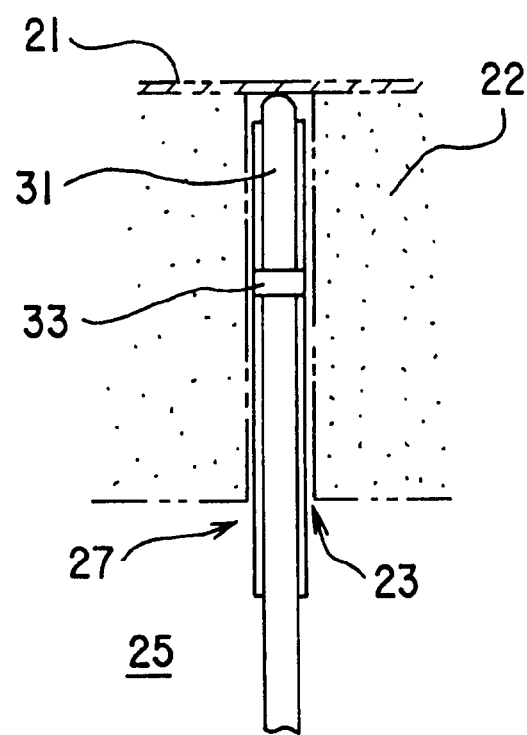
FIG. 4 is a side view showing the pulsation generator.

As shown in FIG. 4, the pulsation generator 25 is installed in the hall 23 so that the part of the tube 31 at the top portion 29 may touch the skin layer 21. A back end of the tube 31 is connected with an air supplier. Electric-air proportional control valves receive signals output from computer, namely an electric signal supplier, and vary air pressure inside the tube 31.

Figure 5:
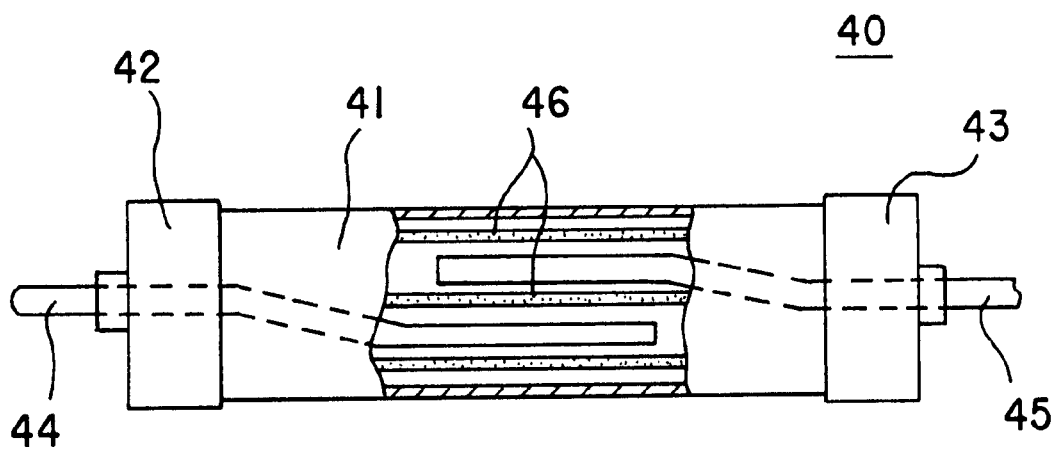
FIG. 5 is a partly broken front view showing the muffler.

FIG. 5 shows a partially cutaway view of a muffler 40 which is placed on an air supply pipe of the air supplier.

Both ends of a cylinder 41 are sealed tight by caps 42, 43. An air inhalant pipe 44 is inserted into the cylinder 41 from the cap 42 and an air exhaust pipe 45 is inserted into the cylinder 41 from the cap 43. The total of the portions, which exist inside of the cylinder 41, of the air inhalant pipe 44 and the air exhaust pipe 45 is longer than the cylinder 41. Hence, the top end portions of the air inhalant pipe 44 and the air exhaust pipe 45 run parallel to each other.

A non-woven fabrics 46 made from glass fibers are interposed between the air inhalant pipe 44 and the air exhaust pipe 45. The non-woven fabrics 46 are wound loosely and are placed in the cylinder 41. The wound non-woven fabrics 46 form several layers and the air inhalant pipe 44 and the air exhaust pipe 45 are inserted in the different layers of the wound non-woven fabrics 46 in order to facilitate the assembly of the muffler 40.

It is preferable to make the cylinder 41, the caps 42, 43, the air inhalant pipe 44 and the air exhaust pipe 45 from the material which does not change their thickness by air supply. Incidentally, when forming the cylinder 41 thickly, as air is compressed in the cylinder 41, the change of air pressure in the pulsation generator 25 becomes inactive and it is difficult to form sharp pulsation waveform. Therefore, the cylinder 41 should not be too thick.

Figure 6:
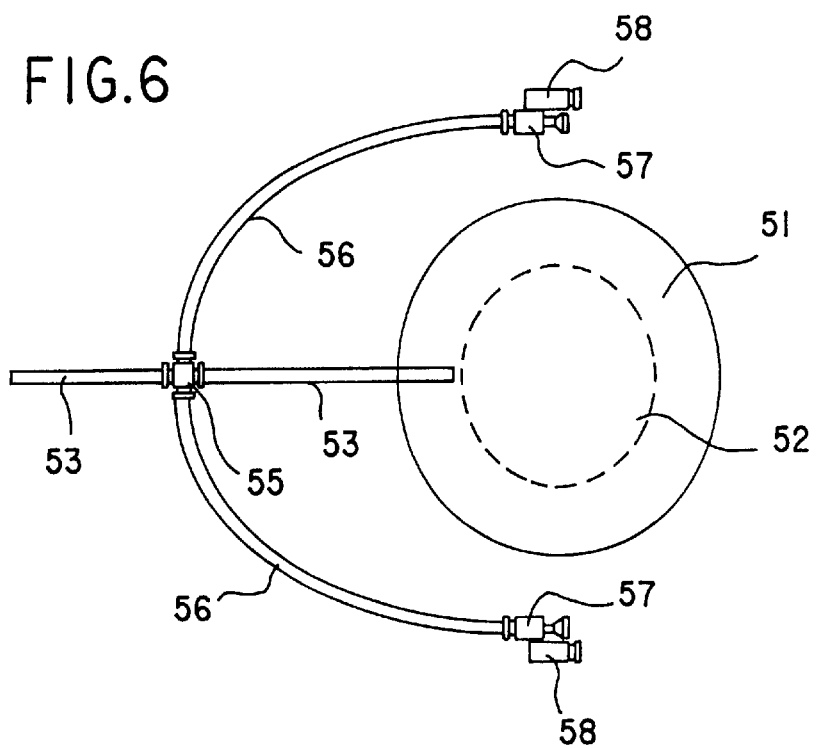
FIG. 6 is a plan view showing the respiration sound and movement generator.

FIG. 6 shows a plan view of a respiration sound and movement generator 50. A hall, which reaches the skin layer 21, is formed in the foam body 22 from the back of the abdomen 11 of the mannequin M. Said generator 50 is placed in the hall.

A respiration movement generating section of the generator 50 comprises an air bag 51 wherein the sheet 52 is housed. The air bag 51 is formed by a soft P.V.C. film and the sheet 52 is formed by a foam material made from soft urethane resins. The air bag 51 is connected with the air inhalant pipe 53. Since air is supplied to the air bag 51 along the sheet 52, it is possible to suppress a turbulence inside the air bag 51 and hence the air bag 51 expands and contracts with giving rise to little sound.

Incidentally, air from the electric-air proportional control valves is supplied to the air inhalant pipe 53 after being silenced by the muffler 40 which is shown in FIG. 5.

The air inhalant pipe 53 is equipped with the diverging coupler 55. Branch pipes 56, 56 are connected with the diverging coupler 55. When air is supplied to the air bag 51 through the air inhalant pipe 53, the diverging coupler 55 decreases air supplying to the branch pipes 56, 56. Air exhausted by contraction of the air bag 51 are blown to the branch pipes 56, 56.

A top end of the branch pipe 56 is sealed by a closure member 57 and an air pressure control valve 58 is connected with the closure member 57. The air pressure control valve 58 is placed in auscultation positions 12, 13. Air supplied to the branch pipe 56 is blown to the back side of the skin layer 21 through the air pressure control valve 58. Although it gives rise to frictional sound when air passes through the air pressure control valve 58, frictional sound, caused by air being supplied to the air bag 51, becomes inspiration sound, and frictional sound, caused by air being blown from the air bag 51, becomes expiration sound.

It is preferable to adjust the diverging coupler 55 and the air pressure control valve 58 so that the ratio of inspiration to expiration may be approximately 3:2.

Figure 7:
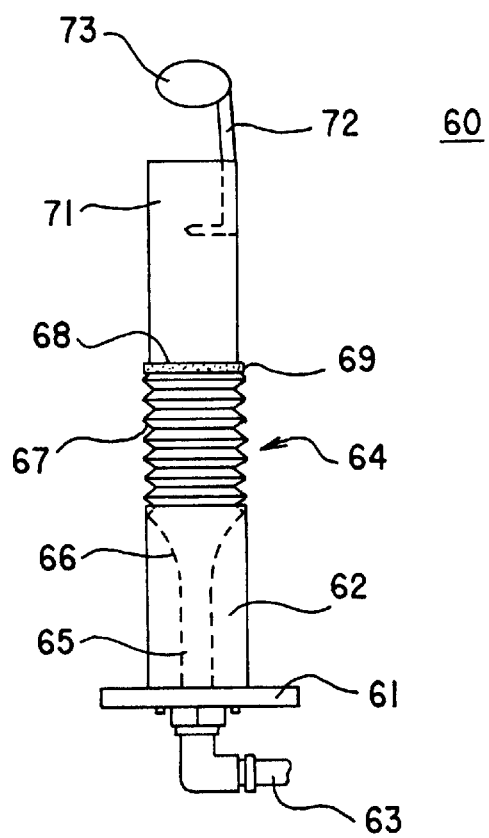
FIG. 7 is a front view showing cardiac impulse generator.

FIG. 7 shows a front view of a cardiac impulse generator 60. This generator 60 has an air pump 64. This air pump 64 is supported by a cylindrical supporter 62 which is made from lumber and is fixed on a base 61.

The air pump 64 is made from polyethylene resins and has a bellows 67 whose top end is sealed. A lower portion 65 of the air pump 64 is connected with a supply pipe 63. A guide wall 66 is smoothly curved, and between the lower portion 65 and the bellows 67, the guide wall 66 forms an air path which gradually gets thicker toward the bellows 67. An inner wall of a sealed top end 68 of the air pump 64 is covered by a non-woven fabric sheet 69 made from glass fibers. When air is supplied inside the air pump 64, the inner portion of air blows straight and collides with the top end 68. However, such collision of air does not generate any sound since the top end 68 is covered by non-woven fabric sheet 69. Further, as outer portion of air blows along the guide wall 66, air turbulence is suppressed in the air pump 64 and noise due to air turbulence is also suppressed as little as possible.

A stand 71 made of wood is fixed on the top of the air pump 64. An arm 72 project out from the stand 71. A soft touching member 73 which touches skin layer 21 is fixed on the top end of the arm 72.

When air is supplied or absorbed to the pump 64 through the supply pipe 63, the air pump 64 expands and contracts at the bellows 67 with little sound and the touching member 73 goes up and down.

Air, which is supplied from the electric-air proportional control valves to the cardiac impulse generator 60, is silenced by the muffler 40 shown in FIG. 5.

Although in this embodiment, the supporter 62 and the stand 71 are made of wood which is easy to process, it is possible to use synthetic resin foam, rubbers, a compact made from synthetic resins or metals therefor.

It is possible to use rubbers or synthetic resins for the air pump 64.

Further, the arm 72 is made of a metallic bar and projects upward from the side of the stand 71. Even if the cardiac impulse generator 60 gives rise to any sound, it is possible to suppress such sound by turning the lower portion of the arm 72 sideways and projecting the other portion of the arm 72 upward since such sound is propagated lengthwise. And the stand 71, the arm 72 and the touching member 73 are made from different material from each other in order that the natural frequency of those are also different from each other to prevent the cardiac impulse generator 60 from resonating.

Incidentally, it is able to modify the outward shape of the touching member 73 according to the touching face with the skin layer 21, and feeling in a finger when diagnosed.

As this invention may be embodied in a several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A cardiology patient simulator for medical training comprising:

a mannequin, made of foam material, and having a skin layer on its surface;

a tube, placed along the back side of the skin layer in a pulsation position, and changing its thickness by inside air pressure;

a supporter, made of soft material, and for supporting an outer periphery of the tube from the back of the mannequin; and an air supplier, controlled by a electric signal supplier, and for supplying the tube with air changing its pressure, the air supplier has a muffler including:

a sealed cylinder;

an air inhalant pipe, inserted into the sealed cylinder from its one side;

an air exhaust pipe, inserted into the sealed cylinder from its another side;

an air permeable and sound insulating material, interposed in an air flow way between both pipes.

\* \* \* \* \*